United States Patent
Zare et al.

(10) Patent No.: US 10,601,054 B2
(45) Date of Patent: Mar. 24, 2020

(54) FUEL CELL WITH IMPINGEMENT JET FLOW FIELD

(71) Applicants: Amir Hossein Zare, Shiraz (IR); Saeed Khademi, Behbahan (IR)

(72) Inventors: Amir Hossein Zare, Shiraz (IR); Saeed Khademi, Behbahan (IR)

(*) Notice: Subject to any disclaimer, the term of this patent is extended or adjusted under 35 U.S.C. 154(b) by 96 days.

(21) Appl. No.: 16/035,592

(22) Filed: Jul. 14, 2018

(65) Prior Publication Data
US 2020/0020960 A1 Jan. 16, 2020

(51) Int. Cl.
| | |
|---|---|
| H01M 8/0258 | (2016.01) |
| H01M 8/0234 | (2016.01) |
| H01M 4/88 | (2006.01) |
| H01M 8/1004 | (2016.01) |
| H01M 4/86 | (2006.01) |

(52) U.S. Cl.
CPC ....... *H01M 8/0258* (2013.01); *H01M 4/8807* (2013.01); *H01M 8/0234* (2013.01); *H01M 8/1004* (2013.01); *H01M 2004/8684* (2013.01); *H01M 2004/8689* (2013.01)

(58) Field of Classification Search
None
See application file for complete search history.

(56) References Cited

U.S. PATENT DOCUMENTS

| | | | |
|---|---|---|---|
| 5,798,187 A | 8/1998 | Wilson | |
| 5,863,671 A * | 1/1999 | Spear, Jr. | H01M 8/241 |
| | | | 429/413 |
| 6,503,653 B2 | 1/2003 | Rock | |
| 7,097,931 B2 * | 8/2006 | Abdou | H01M 8/0258 |
| | | | 429/492 |
| 7,524,575 B2 | 4/2009 | Bai | |
| 7,923,168 B2 * | 4/2011 | Krothapalli | H01M 8/0247 |
| | | | 429/505 |
| 2002/0160242 A1 * | 10/2002 | Dagard | A61L 9/12 |
| | | | 429/414 |
| 2003/0203260 A1 * | 10/2003 | Lee | H01M 8/04074 |
| | | | 429/434 |
| 2013/0316260 A1 * | 11/2013 | Cherchi | H01M 8/0267 |
| | | | 429/434 |
| 2014/0057194 A1 | 2/2014 | Wilkosz | |
| 2019/0207229 A1 * | 7/2019 | Berner | H01M 8/0206 |

OTHER PUBLICATIONS

Cho, Applications of impingement jet cooling systems, Cooling Systems: Energy, Engineering and Applications, Mar. 1, 2011, pp. 37-67, 2011.

* cited by examiner

*Primary Examiner* — Scott J. Chmielecki
(74) *Attorney, Agent, or Firm* — Summit Patent Group

(57) ABSTRACT

A bipolar plate is provided that comprises a flow field. The bipolar plate is part of a fuel cell and may comprise a chamber, such as a reactants accumulation chamber, on a first side of the bipolar plate. The flow field may comprise a plurality of holes, such as a jet array of impingement jet passages. The flow field may comprise a plurality of channels on a second side of the bipolar plate. The plurality of holes may be configured to conduct reactants from the first side of the bipolar plate to the second side of the bipolar plate to impinge on a membrane electrode assembly (MEA) of the fuel cell. The plurality of channels on the second side of the bipolar plate are configured to conduct a portion of the reactants and/or reaction products to an output hole and/or a channel.

20 Claims, 8 Drawing Sheets

FUEL CELL WITH IMPINGEMENT JET FLOW FIELD

BACKGROUND

A fuel cell may comprise bipolar plates for directing reactants over a membrane electrode assembly (MEA). A design for providing uniform (e.g., flow) distribution of the reactants over the MEA is a challenge but is imperative for the commercialization of fuel cells. Further, reducing friction, increasing the active surface area of the MEA, reducing thermal stresses and/or preventing the formation of hotspots within fuel cells are desired for higher efficiency, lower costs, increased safety and increased life expectancy of fuel cells.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a fuel cell is provided. The fuel cell comprises a bipolar plate comprising a chamber on a first side of the bipolar plate. The bipolar plate comprises a plurality of holes at a first side of the chamber, wherein each hole of the plurality of holes extends from the first side of the chamber to a second side of the bipolar plate, the second side of the bipolar plate different than the first side of the bipolar plate. The fuel cell comprises a membrane electrode assembly (MEA) adjacent to the second side of the bipolar plate, the MEA comprising an electrolyte between a first catalyst and a second catalyst, wherein the plurality of holes are configured to conduct reactants flowing from the chamber to the second side of the bipolar plate and impinge on the MEA. The first catalyst and the second catalyst may be sandwiched between a first gas diffusion layer (GDL) and a second GDL.

In an example, a bipolar plate is provided. The bipolar plate comprises a plurality of holes at a first side of the bipolar plate, wherein each hole of the plurality of holes extends from the first side of the bipolar plate to a second side of the bipolar plate, the second side of the bipolar plate different than the first side of the bipolar plate, wherein the plurality of holes are configured to conduct reactants flowing from the first side of the polar plate to the second side of the bipolar plate.

In an example, a fuel cell is provided. The fuel cell comprises a first bipolar plate and a second bipolar plate. The fuel cell comprises an MEA between the first bipolar plate and the second bipolar plate, the MEA comprising an electrolyte between a first catalyst and a second catalyst. The first catalyst and the second catalyst may be sandwiched between a first GDL and a second GDL. The bipolar plate comprises a first chamber on a first side of the first bipolar plate. The bipolar plate comprises a first plurality of holes at a first side of the first chamber, wherein each hole of the first plurality of holes extends from the first side of the first chamber to a second side of the first bipolar plate, the second side of the first bipolar plate different than the first side of the first bipolar plate and adjacent to the MEA, wherein the first plurality of holes are configured to conduct first reactants flowing from the bottom of the first chamber to the second side of the first bipolar plate and impinge on at least one of the first catalyst or a first GDL between the first bipolar plate and the first catalyst. The fuel cell comprises a second chamber on a first side of the second bipolar plate. The fuel cell comprises a second plurality of holes at a first side of the second chamber, wherein each hole of the second plurality of holes extends from the first side of the second chamber to a second side of the second bipolar plate, the second side of the second bipolar plate different than the first side of the second bipolar plate and adjacent to the MEA, wherein the second plurality of holes is configured to conduct second reactants flowing from the second chamber to the second side of the second bipolar plate and impinge on at least one of the second catalyst or a second GDL between the second bipolar plate and the second catalyst.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Figure 1:
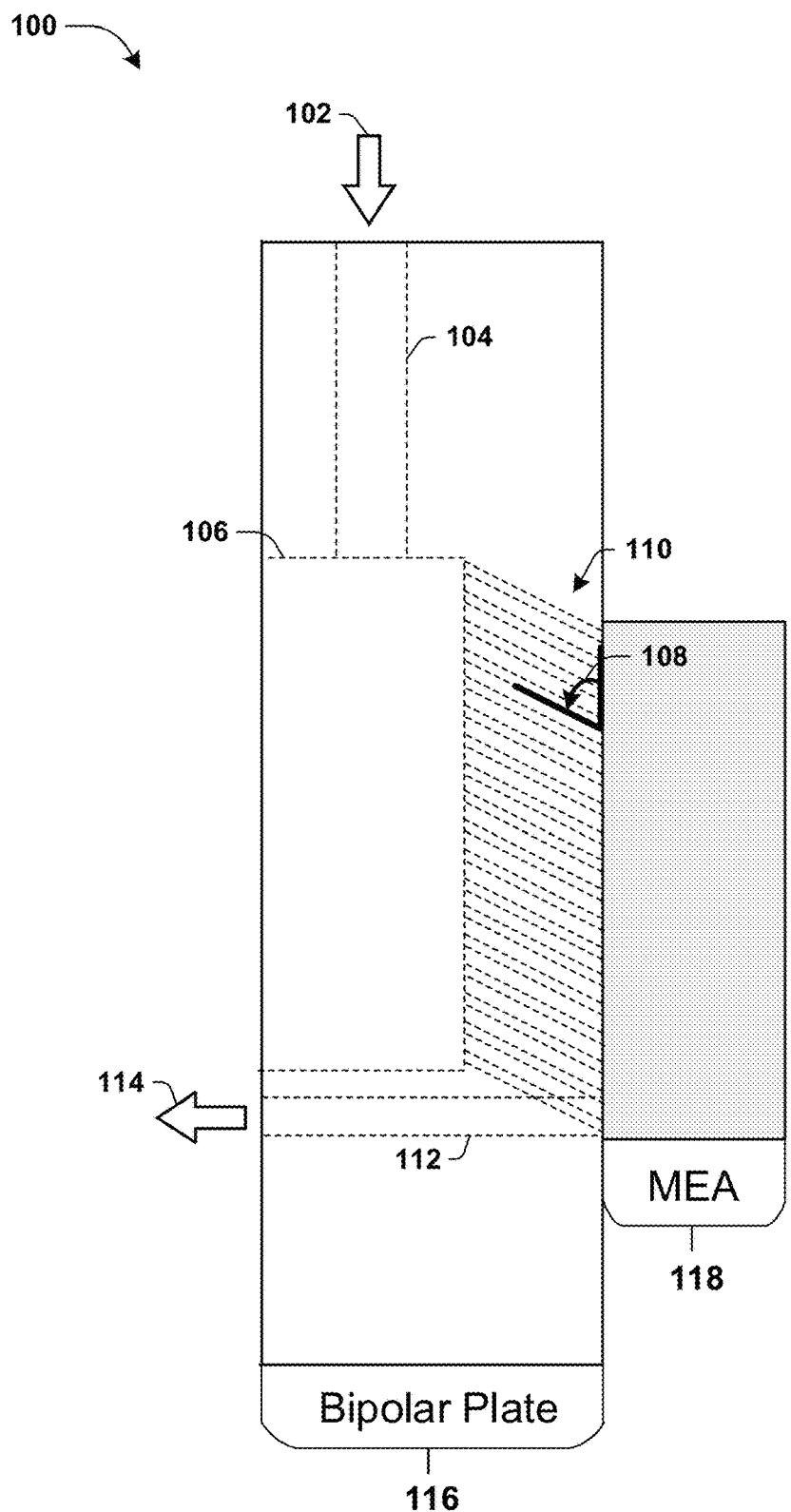
FIG. 1 is a cross-sectional diagram of a system for conducting reactants in a fuel cell comprising a bipolar plate and a membrane electrode assembly (MEA).

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of mechanical devices, electro-mechanical devices, electrical devices or any combination thereof.

One or more methods, techniques, devices and/or systems are provided for use in fuel cells. For example, a fuel cell may comprise a bipolar plate (e.g., a flow field plate) adjacent to a first side of a membrane electrode assembly (MEA) of the fuel cell. The fuel cell may (e.g., further) comprise a second bipolar plate (e.g., a second flow field plate) adjacent to a second side of the MEA. The bipolar plate may comprise a flow field comprising a chamber (e.g., a reactants accumulation chamber), a plurality of holes (e.g., a jet array of impingement jet passages) and/or a plurality of channels. The flow field (e.g., of the bipolar plate) may be configured to conduct reactants to impinge on the MEA with a uniform flow distribution and minimal pressure loss. Therefore, an operating pressure (e.g., and/or a pressure gradient) of the reactants impinging on a first part of a surface of the MEA and the reactants impinging on a second part of the surface of the MEA may be significantly reduced (e.g., compared to common methods, techniques and/or devices used).

The flow field (e.g., of the bipolar plate) may comprise one or more input holes (e.g., entrance manifolds) configured to conduct the reactants from a source (e.g., of the reactants) into the chamber. The reactants may stagnate and/or accumulate inside the chamber which may reduce the turbulence of the (e.g., flow of) reactants (e.g., compared to common methods, techniques and/or devices used).

The plurality of holes (e.g., of the flow field) may be configured to conduct the reactants to impinge on a gas diffusion layer (GDL) and/or (e.g., reaction sites of) a catalyst (e.g., layer) of the MEA. Rather than conducting the reactants with parallel movement (e.g., such as in common methods, techniques and/or devices used), the plurality of holes may be configured to conduct the reactants to impinge on (e.g., and/or spray onto) the MEA directly. This may lead to benefits including, but not limited to, a uniform (e.g., flow) distribution of the reactants impinging on the MEA, an increased active (e.g., surface) area of (e.g., reaction sites of) the catalyst (e.g., layer), a reduction in losses due to the mitigation of the reactants flow (e.g., through the plurality of holes), increased momentum of (e.g., the flow of) the reactants impinging on the MEA and/or a more intense penetration of the reactants impinging on the MEA.

Further benefits include a uniform production of electric current, heat and water throughout the surface of the MEA (e.g., as a result of the uniform distribution of the reactants impinging on the MEA), which may result in a prevention and/or reduction of hot spots on the surface of the MEA and/or thermal stresses of the MEA. Further benefits include a lower operating pressure of the fuel cell (e.g., compared to common methods, techniques and/or devices used) which may result in a reduction in size (e.g., weight, volume, etc.) and/or cost of the fuel cell (e.g., as a result of a reduction in size of compressors and other equipment required to feed the reactants into the fuel cell, etc.). Further benefits include facilitation of upscaling of fuel cells and, subsequently, commercialization of fuel cell technology (e.g., as a result of the uniform distribution of the reactants impinging on the MEA and/or the minimum pressure loss throughout the surface of the MEA).

The plurality of channels may be configured to conduct excess (e.g., unused) reactants and/or the reaction products to one or more output holes (e.g., and/or an exhaust manifold). The one or more output holes may be configured to conduct the excess reactants and/or the reaction products to outside of the fuel cell. The plurality of channels and/or the one or more output holes may be configured such that the excess reactants and/or the reaction products may be prevented from accumulating in the fuel cell (e.g., water accumulation in the fuel cell may be prevented). Accordingly, water accumulation and/or flooding (e.g., particularly in low-temperature fuel cells) may be diminished (e.g., compared to common methods, techniques and/or devices used), concentration losses may be reduced and stability of the fuel cell may be increased and/or improved. Channels of the plurality of channels may be separated from each other by extrusions (e.g., walls) and may be parallel to each other. In some examples, a height of the extrusions may be configured for setting a distance between (e.g., outlets of) the plurality of holes and the MEA to optimize a distribution of (e.g., flow of) the reactants (e.g., impinging) on the MEA. The plurality of channels may (e.g., further) be configured to provide a solid support for the MEA.

FIG. 1 presents a system 100 for conducting reactants in a fuel cell. In an example, a fuel cell (e.g., a polymer electrolyte membrane fuel cell, an alkaline fuel cell, a solid oxide fuel cell, a phosphoric acid fuel cell, a direct methanol fuel cell, a molten carbonate fuel cell and/or a different type of fuel cell) may comprise a bipolar plate 116 (e.g., a flow field plate) and an MEA 118 adjacent to the bipolar plate 116. In some examples, the fuel cell is comprised in a plurality of fuel cells (e.g., a fuel cell stack) combined in series and/or parallel. In some examples, the MEA 118 may comprise an electrolyte (e.g., sandwiched) between two catalyst layers. The MEA 118 may (e.g., further) comprise a first GDL (e.g., an anode GDL) on a first side of a first catalyst layer (e.g., an anode catalyst layer) and/or a second GDL (e.g., a cathode GDL) on a first side of a second catalyst layer (e.g., a cathode catalyst layer). For example, the electrolyte and/or the two catalyst layers may be (e.g., sandwiched) between the first GDL and the second GDL. In some examples, the MEA 118 may comprise the first GDL, the second GDL, the electrolyte and/or the two catalyst layers.

The bipolar plate 116 may be a flow field plate comprising a flow field configured to conduct (e.g., direct, channel, etc.) reactants 102 (e.g., hydrogen, oxygen, etc.) to impinge on the MEA 118. For example, the flow field (e.g., of the bipolar plate 116) may be configured to conduct the reactants to impinge on the anode, the cathode, the first GDL and/or the second GDL. The bipolar plate 116 may comprise a material such as metal, coated metal, graphite, flexible graphite, carbon-carbon composites, carbon-polymer composites, etc.

The flow field (e.g., of the bipolar plate 116) may comprise a chamber 106 (e.g., a cavity, a hollow space, a reactants accumulation chamber, etc.) on a first side of the bipolar plate 116. In some examples, the chamber 106 may comprise an opening (e.g., at the first side of the bipolar plate 116) and the opening may be enclosed using a different plate (e.g., other than the bipolar plate 116) adjacent to the first side of the bipolar plate 116 and/or the opening may be enclosed using a sheet adjacent to the first side of the bipolar plate 116. The chamber 106 may be a 3-dimensional shape (e.g., a hexahedron, a different type of polyhedron, a cylinder, etc.). Accordingly, a first side of the chamber 106 and/or a second side of the chamber 106 may comprise a 2-dimensional shape (e.g., a triangle, a quadrangle, a hexagon, an octagon, a circle, an ellipse, etc.). In some examples, the first side of the chamber 106 may have a first dimension (e.g., area, width, height, diameter, circumference, etc.) and the second side of the chamber 106 may have a second dimension (e.g., area, width, height, diameter, circumference, etc.). The first dimension may be equal to the second dimension or the first dimension may be not equal to the second dimension.

The flow field (e.g., of the bipolar plate 116) may comprise a plurality (e.g., an array) of holes 110 (e.g., a jet array of impingement jet passages) at the first side of the chamber 106. The plurality of holes 110 may extend from the first side of the chamber 106 to a second side of the bipolar plate 116 (e.g., different than the first side of the bipolar plate 116, opposite to the first side of the bipolar plate 116, etc.). In some examples, each hole of the plurality of holes 110 comprises a 3-dimensional shape (e.g., a hexahedron, a triangular prism, a different type of polyhedron, a cylinder, etc.). In some examples, a first opening of each hole of the plurality of holes 110 has a third dimension (e.g., area, width, height, diameter, circumference, etc.) and a second opening of each hole of the plurality of holes 110 has a fourth dimension (e.g., area, width, height, diameter, circumference, etc.). The third dimension may be equal to the fourth dimension or the third dimension may be not equal to the fourth dimension. In some examples, the first opening of each hole of the plurality of holes 110 and/or the second opening of each hole of the plurality of holes 110 comprises a triangle, a quadrangle, a hexagon, an octagon, a circle, an ellipse or a different shape.

In some examples, a distance (e.g., interval) between holes of the plurality of holes 110 may be configured based upon optimizing efficiency and/or costs of the fuel cell. In some examples, lengths of holes of the plurality of holes 110 may be configured based upon optimizing efficiency and/or costs of the fuel cell and/or a first length of a first hole of the plurality of holes 110 may be equal to or not equal to a second length of a second hole of the plurality of holes 110. Alternatively and/or additionally, a number of holes of the plurality of holes 110 may be configured based upon optimizing efficiency and/or costs of the fuel cell.

In some examples, (e.g., a direction of) the plurality of holes 110 may be at an angle 108 relative to the MEA 118. For example, the angle 108 may be between 0 degrees and 90 degrees (e.g., 45 degrees, 60 degrees, 90 degrees, etc.). In some examples, the angle 108 may be configured to optimize a distribution of the reactants 102 (e.g., impinging) on the MEA 118 and/or to (e.g., efficiently) remove reaction products (e.g., generated at the MEA 118 and/or the bipolar plate 116 and/or between the MEA 118 and the bipolar plate 116) from the fuel cell.

In some examples, the bipolar plate 116 may comprise one or more input holes 104 configured to conduct the reactants 102 flowing from a source (e.g., of the reactants 102) to the chamber 106. In some examples, the one or more input holes 104 may comprise a shape (e.g., a hexahedron, a triangular prism, a different type of polyhedron, a cylinder, etc.) and/or one or more dimensions (e.g., angle, area, width, height, diameter, circumference, etc.) configured based upon optimizing efficiency and/or costs of the fuel cell. In some examples, the one or more input holes 104 may extend from a third side of the bipolar plate 116 to a third side of the chamber 106.

The one or more input holes 104 may be connected to the source and the reactants 102 may flow through the one or more input holes 104 into the chamber 106. The reactants 102 may accumulate inside the chamber 106. The plurality of holes 110 (e.g., and/or the flow field) may be configured to conduct the reactants 102 flowing from the chamber 106 (e.g., and/or inlets of the plurality of holes 110) to the second side of the bipolar plate 116 and impinge on the MEA 118 (e.g., directly). In some examples, the plurality of holes 110 (e.g., and/or the flow field) may be configured to conduct the reactants 102 flowing from the chamber 106 to the second side of the bipolar plate 116 and impinge on the MEA 118 automatically and/or responsive to a threshold amount of the reactants 102 accumulating inside the chamber 106.

In some examples, a distance of a space between the second side of the bipolar plate 116 and the MEA 118 (e.g., the space comprising a sealing layer and/or the space not comprising the sealing layer) may be configured to optimize a distribution of (e.g., flow of) the reactants 102 (e.g., impinging) on the MEA 118 (e.g., and/or a catalyst layer).

It may be appreciated that the flow field (e.g., of the bipolar plate 116) (e.g., comprising the chamber 106 and/or the plurality of holes 110) may be configured such that the reactants 102 may impinge on the MEA 118 with a uniform (e.g., flow) distribution and minimal pressure loss, wherein a pressure loss (e.g., and/or a pressure gradient) of the reactants 102 impinging on a first part of a surface of (e.g., the catalyst layer of) the MEA 118 and the reactants 102 impinging on a second part of the surface of (e.g., the catalyst layer of) the MEA 118 may be significantly reduced (e.g., compared to common methods, techniques and/or devices used). Further, the flow trajectory of the reactants 102 may be significantly reduced (e.g., compared to common methods, techniques and/or devices used). Accordingly, implementation of the flow field (e.g., of the bipolar plate 116) may lead to benefits including, but not limited to, an increased active surface area of the MEA 118 leading to more efficient use of the MEA 118 (e.g., the anode catalyst layer, the cathode catalyst layer and/or the electrolyte), prevention and/or reduction in concentration losses (e.g., as a result of the uniform flow distribution and, consequently, the minimal pressure loss throughout the MEA surface 118), a significant reduction in friction losses due to the flow path reduction of the reactants 102, more efficient thermal energy removal (e.g., higher energy output levels and/or lower input levels of reactants and/or fuel compared to common methods, techniques and/or devices used), greater life expectancy of the MEA 118 and/or the fuel cell (e.g., as a result of the minimal pressure loss throughout the surface of the MEA 118), increased safety of the fuel cell (e.g., compared to common methods, techniques and/or devices used), increased uniformity of heat throughout the surface of the MEA 118 (e.g., preventing the formation of hotspots on the surface of the MEA 118 and/or reducing thermal stresses on the MEA 118), an improved and/or increased stability of the fuel cell, and/or more efficient flow of the reactants 102 (e.g., as a result of the direct flow and/or impingement of the reactants 102 from the inlets of the plurality of holes 110 to the MEA 118), an increased cooling effect in the fuel cell (e.g., as a result of the inherent nature of the impingement jet of the flowing reactants 102 and providing a more effective transmission of heat to travel from the MEA 118 to outside of the fuel cell, etc.) and/or a lower operating pressure of the fuel cell as a result of the significant reduction in losses caused by friction, and consequently, a reduction in size (e.g., weight, volume, etc.) and/or cost of the MEA 118 and/or the fuel cell and its balance of plant, (as a result of a reduction in size of compressors and other equipment required to input the reactants 102 into the fuel cell, etc.) and more efficient use of the catalyst layer due to the intense penetration of the reactants into the catalyst layer. It may assist in reducing the catalyzer (e.g. platinum) loading of the catalyst layer which reduces the costs.

In some examples, the flow field (e.g., and/or the bipolar plate 116) may comprise one or more output holes 112 at the second side of the bipolar plate 116. In some examples, the one or more output holes 112 may comprise a shape (e.g., a hexahedron, a triangular prism, a different type of polyhedron, a cylinder, etc.) and/or one or more dimensions (e.g., angle, area, width, height, diameter, circumference, etc.) configured based upon optimizing efficiency and/or costs of the fuel cell. The one or more output holes 112 may extend from the second side of the bipolar plate 116 to the first side of the bipolar plate 116, the second side of the bipolar plate 116 or a different side of the bipolar plate 116. The one or more output holes 112 may be configured to conduct a combination 114 of a portion of the reactants 102 (e.g., excess reactants, unused reactants, etc.) and/or reaction products (e.g., generated at the MEA 118 and/or the bipolar plate 116 and/or between the MEA 118 and the bipolar plate 116) flowing from the second side of the bipolar plate 116 to the first side of the bipolar plate 116 (e.g., and/or to outside of the fuel cell). In some examples, the reaction products may comprise water, steam and/or carbon dioxide. In some examples, the flow field (e.g., of the bipolar plate 116) may comprise a plurality of channels on the second side of the bipolar plate 116 configured to conduct the portion of the reactants 102 and/or the reaction products to the one or more output holes 112.

In some examples, the plurality of channels may comprise a shape (e.g., a hexahedron, a triangular prism, a different type of polyhedron, a cylinder, etc.) and/or one or more dimensions (e.g., angle, area, width, height, diameter, circumference, etc.) configured based upon the plurality of holes 110 and/or optimizing efficiency and/or costs of the fuel cell. Channels of the plurality of channels may be separated from each other by extrusions (e.g., walls) and may be parallel to each other and may be parallel to the second side of the bipolar plate 116 and/or the MEA 118. The extrusions may comprise one or more dimensions (e.g., area, width, height, etc.) configured based upon optimizing efficiency and/or costs of the fuel cell. In some examples, the height of the extrusions may be configured for setting a distance between (e.g., outlets of) the plurality of holes 110 and the MEA 118 to optimize a distribution of (e.g., flow of) the reactants 102 (e.g., impinging) on the MEA 118 (e.g., and/or the catalyst layer). Alternatively and/or additionally, the plurality of channels may conduct the portion of the reactants 102 and/or the reaction products to a second channel and/or to the one or more output holes 112. The second channel may conduct the portion of the reactants 102 and/or the reaction products to the one or more output holes 112.

It may be appreciated that the flow field (e.g., of the bipolar plate 116) (e.g., comprising the one or more output holes 112, the plurality of channels and/or the second channel) may be configured such that the portion of the reactants 102 and/or the reaction products may be prevented from accumulating in the fuel cell. Accordingly, water accumulation and/or flooding in the fuel cell may be decreased (e.g., compared to common methods, techniques and/or devices used) and the stability of the fuel cell may be increased and/or improved.

It may be appreciated that the flow field (e.g., of the bipolar plate 116) may not comprise the chamber 106. Accordingly, the reactants 102 may be conducted to the plurality of holes 110 (e.g., the jet array of impingement jet passages) using one or more (e.g., other) techniques.

Figure 2:
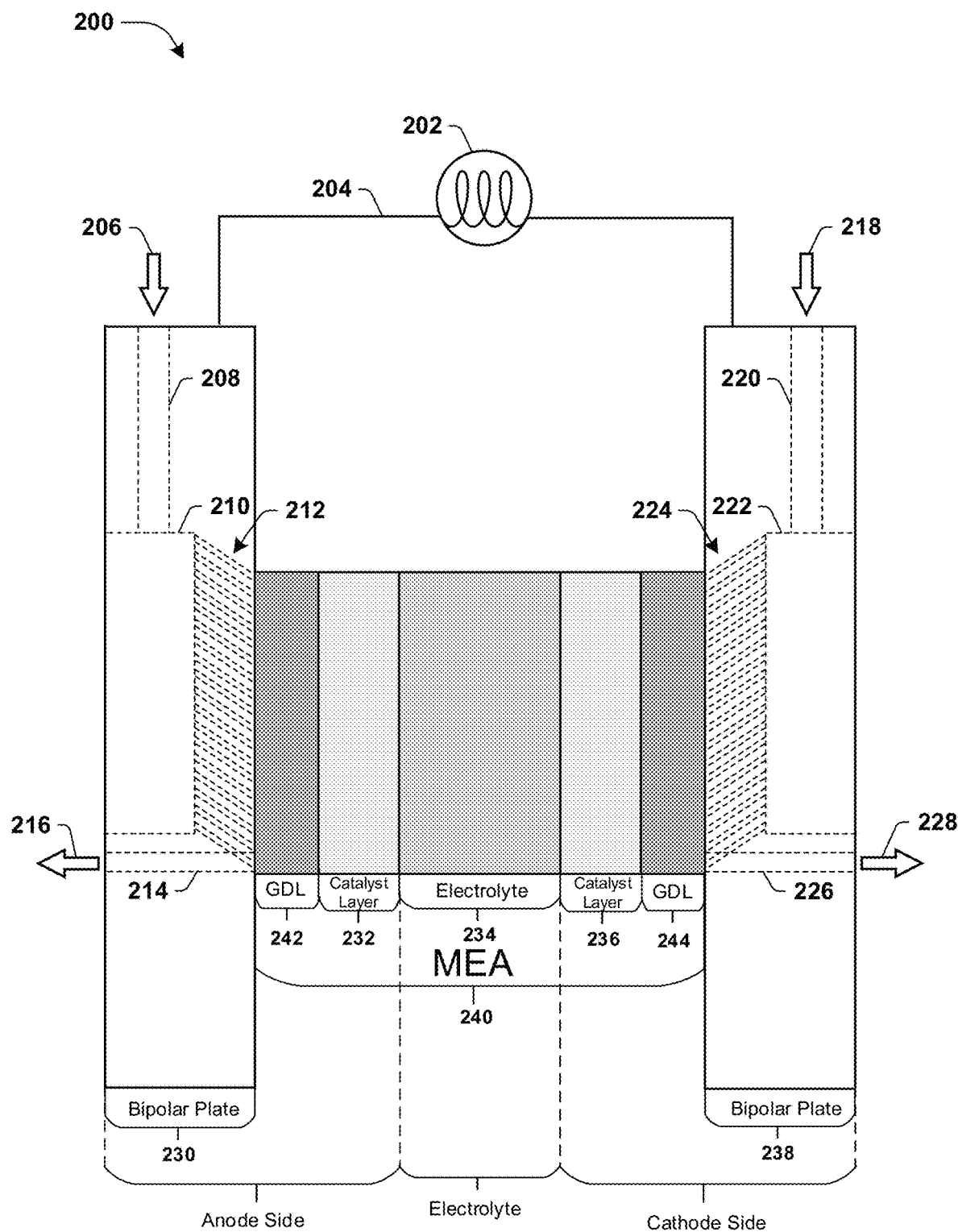
FIG. 2 is a cross-sectional diagram of an exemplary fuel cell unit with the bipolar plates comprising the present flow field.

FIG. 2 presents a system 200 for conducting reactants in a fuel cell. In an example, a fuel cell may comprise a first bipolar plate 230 (e.g., a first flow field plate), a second bipolar plate 238 (e.g., a second flow field plate) and an MEA 240. In some examples, the first bipolar plate 230 may comprise an anode bipolar plate. Alternatively and/or additionally, the second bipolar plate 238 may comprise a cathode bipolar plate. In some examples, the MEA 240 may comprise an electrolyte 234 between an anode catalyst later 232 and a cathode catalyst layer 236. In some examples, the MEA 240 may comprise a first GDL 242 (e.g., an anode GDL) on a first side of the MEA 240. The first GDL 242 may be adjacent to the anode catalyst layer 232 and/or adjacent to the anode bipolar plate 230. Accordingly, the first GDL 242 may be between the first bipolar plate 230 and the anode catalyst layer 232. The MEA 240 may (e.g., further) comprise a second GDL 244 (e.g., a cathode GDL) on a second side of the MEA 240. The second GDL 244 may be adjacent to the cathode catalyst layer 236 and/or adjacent to the second bipolar plate 238. Accordingly, the second GDL 244 may be between the second bipolar plate 238 and the cathode catalyst layer 236. Alternatively and/or additionally, the first GDL 242 and the second GDL 244 may not be comprised within the MEA 240.

The first bipolar plate 230 may comprise a first flow field configured to conduct (e.g., direct, channel, etc.) first reactants 206 to impinge on the MEA 240 (e.g., and/or the first GDL 242). In some examples, the first reactants 206 may comprise fuel (e.g., hydrogen and/or a different type of fuel). The first bipolar plate 230 may comprise a material such as metal, coated metal, graphite, flexible graphite, carbon-carbon composites, carbon-polymer composites, etc.

The first flow field (e.g., of the first bipolar plate 230) may comprise a first chamber 210 on a first side of the first bipolar plate 230. In some examples, the first chamber 210 may comprise a first opening (e.g., at the first side of the first bipolar plate 230) and the first opening may be enclosed using a different plate and/or using a sheet. Alternatively and/or additionally, the first chamber 210 may not comprise the first opening. The first flow field (e.g., of the first bipolar plate 230) may comprise a first plurality of holes 212 (e.g., a first jet array of impingement jet passages) at a first side of the first chamber 210. The first plurality of holes 212 may extend from the first side of the first chamber 210 to a second side of the first bipolar plate 230 (e.g., different than the first side of the first bipolar plate 230, opposite to the first side of the first bipolar plate 230, etc.). In some examples, (e.g., a direction of) the first plurality of holes 212 may be at an angle relative to the MEA 240 (e.g., wherein the angle may be configured to optimize a distribution the first reactants 206 impinging on the MEA 240).

In some examples, the first bipolar plate 230 may comprise one or more first input holes 208 configured to conduct the first reactants 206 flowing from a source (e.g., of the first reactants 206) to the first chamber 210. In some examples, the first flow field (e.g., and/or first bipolar plate 230) may comprise one or more first output holes 214 at the second side of the first bipolar plate 230. The one or more first output holes 214 may extend from the second side of the first bipolar plate 230 to the first side of first bipolar plate 230.

The second bipolar plate 238 may comprise a second flow field configured to conduct (e.g., direct, channel, etc.) second reactants 218 to impinge on MEA 240 (e.g., and/or the second GDL 244). In some examples, the second reactants 218 may comprise oxygen. The second bipolar plate 238 may comprise a material such as metal, coated metal, graphite, flexible graphite, carbon-carbon composites, carbon-polymer composites and/or a different material.

The second flow field (e.g., of the second bipolar plate 238) may comprise a second chamber 222 on a first side of the second bipolar plate 238. In some examples, the second chamber 222 may comprise a second opening (e.g., at the first side of the second bipolar plate 238) and the second opening may be enclosed using a different plate and/or using a sheet. Alternatively and/or additionally, the second chamber 222 may not comprise the second opening. The second flow field (e.g., of the second bipolar plate 238) may comprise a second plurality of holes 224 (e.g., a second jet array of impingement jet passages) at a first side of the second chamber 222. The second plurality of holes 224 may extend from the first side of the second chamber 222 to a second side of the second bipolar plate 238 (e.g., different than the first side of the second bipolar plate 238, opposite to the first side of the second bipolar plate 238, etc.). In some examples, (e.g., a direction of) the second plurality of holes 224 may be at an angle relative to the MEA 240 (e.g., wherein the angle may be configured to optimize a distribution the second reactants 218 impinging on the MEA 240 and/or the second GDL 244).

In some examples, the second bipolar plate 238 may comprise one or more second input holes 220 configured to conduct the second reactants 218 flowing from a source (e.g., of the second reactants 218) to the second chamber 222. In some examples, the second flow field (e.g., and/or the second bipolar plate 238) may comprise one or more second output holes 226 at the second side of the second bipolar plate 238. The one or more second output holes 226 may extend from the second side of the second bipolar plate 238 to the first side of the second bipolar plate 238.

In some examples the first reactants 206 may accumulate inside the first chamber 210. The first plurality of holes 212 (e.g., of the first flow field) may be configured to conduct the first reactants 206 flowing from the first chamber 210 to the second side of the first bipolar plate 230 and impinge on the MEA 240. Alternatively and/or additionally, the second reactants 218 may accumulate inside the second chamber 222. The second plurality of holes 224 (e.g., of the second flow field) may be configured to conduct the second reactants 218 flowing from the second chamber 222 to the second side of the second bipolar plate 238 and impinge on the MEA 240.

In some examples, (e.g., at least a portion of) the first reactants 206 (e.g., impinging on the MEA 240) may be oxidized (e.g., wherein electrons of the first reactants 206 are separated from the first reactants 206) at the anode catalyst layer 232 to generate the electrons of the first reactants 206 and ions of the first reactants 206. The electrons of the first reactants 206 may travel through a conductor 204 (e.g., connecting the first (e.g., anode) bipolar plate 230 to the second (e.g., cathode) bipolar plate 238) and may deliver (e.g., electrical) energy to a load 202. In some examples, the ions (e.g., traveling from the anode catalyst layer 232, through the electrolyte 234, to the cathode catalyst layer 236), the electrons (e.g., traveling from the first (e.g., anode) bipolar plate 230, through the conductor 204, to the second (e.g., cathode) bipolar plate 238) and the second reactants 218 (e.g., impinging on the MEA 240) may react (e.g., together) to complete the reaction whereby some reaction products are formed (e.g., water vapor or liquid water, carbon dioxide, etc.). In some examples, electrical circuit terminals (e.g., of the conductor 204 and/or the load 202) may be connected to the first (e.g., anode) bipolar plate 230 and/or the second (e.g., cathode) bipolar plate 238. Alternatively and/or additionally, the electrical circuit terminals may be connected to a first end plate and/or a second end plate of the fuel cell. For example, the electrical circuit terminals may be connected to the first end plate and/or the second end plate (e.g., rather than being connected to the first bipolar plate 230 and/or the second bipolar plate 238).

In some examples, a portion 216 of the first reactants 206 (e.g., excess reactants, unused reactants, etc.) may flow from the second side of the first bipolar plate 230 to the first side of the first bipolar plate 230 (e.g., and/or to outside of the fuel cell) via the one or more first output holes 214. In some examples, the first flow field (e.g., of the first bipolar plate 230) may comprise a first plurality of channels on the second side of the first bipolar plate 230 configured to conduct the portion 216 of the first reactants 206 to the one or more first output holes 214. Channels of the first plurality of channels may be parallel to each other and/or may be parallel to the second side of the first bipolar plate 230 and/or to the anode catalyst layer 232. Alternatively and/or additionally, the first plurality of channels may conduct the portion 216 of the first reactants 206 to a second channel and/or to the one or more first output holes 214. The second channel may conduct the portion 216 of the first reactants 206 to the one or more first output holes 214.

Alternatively and/or additionally, a combination 228 of a portion of the second reactants 218 (e.g., excess reactants, unused reactants, etc.) may flow from the second side of the second bipolar plate 238 to the first side of the second bipolar plate 238 (e.g., and/or to the outside of the fuel cell) via the one or more second output holes 226. In some examples, the second flow field (e.g., of the second bipolar plate 238) may comprise a second plurality of channels on the second side of the second bipolar plate 238 configured to conduct the combination 228 to the one or more second output holes 226. Channels of the second plurality of channels may be parallel to each other and/or may be parallel to the second side of the second bipolar plate 238 and/or to the cathode catalyst layer 236 (e.g., and/or to the anode catalyst layer 232). Alternatively and/or additionally, the second plurality of channels may conduct the combination 228 to a third channel and/or to the one or more second output holes 226. The third channel may conduct the combination 228 to the one or more second output holes 226.

It may be appreciated that the first flow field (e.g., of the first bipolar plate 230) may not comprise the first chamber 210. Accordingly, the first reactants 206 may be conducted to the first plurality of holes 212 (e.g., the first jet array of impingement jet passages) using one or more (e.g., other) techniques. Alternatively and/or additionally, the second flow field (e.g., of the second bipolar plate 238) may not comprise the second chamber 222. Accordingly, the second reactants 218 may be conducted to the second plurality of holes 212 (e.g., the second jet array of impingement jet passages) using one or more (e.g., other) techniques.

Figure 3:
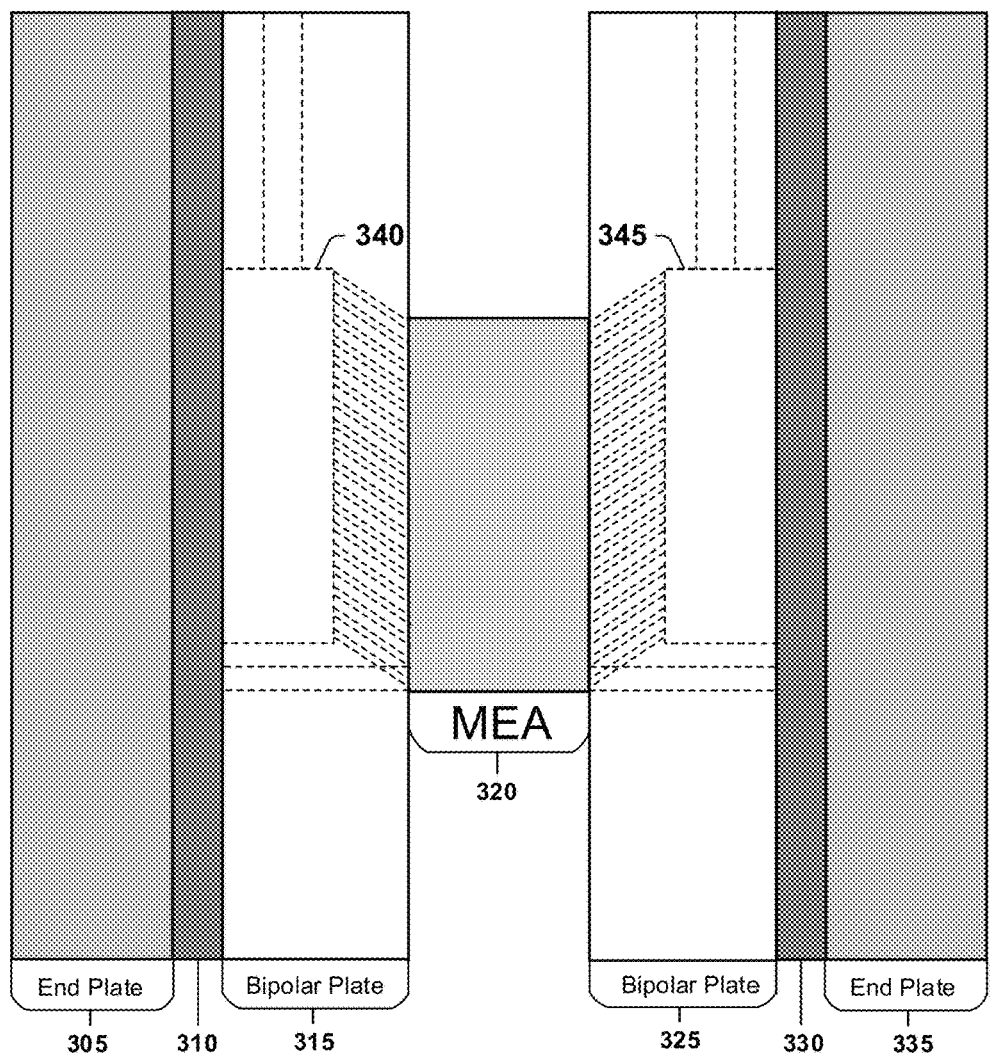
FIG. 3 is a cross-sectional diagram of a fuel cell comprising a first end plate, a first sheet, a first bipolar plate, an MEA, a second end plate, a second sheet and a second bipolar plate.

FIG. 3 presents a fuel cell 300 comprising a first end plate 305, a first sheet 310, a first bipolar plate 315, an MEA 320, a second end plate 335, a second sheet 330 and a second bipolar plate 325. In some examples, the MEA 320 may comprise an electrolyte between a first catalyst layer (e.g., an anode catalyst layer) and a second catalyst layer (e.g., a cathode catalyst layer) and thereon a first GDL and a second GDL, respectively. In some examples, the first bipolar plate 315 may comprise a first flow field comprising a first chamber 340 on a first side of the first bipolar plate 315 (e.g., adjacent to the first sheet 310 and/or to the first end plate 305). In some examples, the first chamber 340 may comprise a first opening (e.g., at the first side of the first bipolar plate 315) and the first opening may be enclosed by the first sheet 310 and/or by the first end plate 305. Alternatively and/or additionally, the second bipolar plate 325 may comprise a second flow field comprising a second chamber 345 on a first side of the second bipolar plate 325 (e.g., adjacent to the second sheet 330 and/or to the second end plate 335). In some examples, the second chamber 345 may comprise a second opening (e.g., at the first side of the second bipolar plate 325) and the second opening may be enclosed by the second sheet 330 and/or by the second end plate 335. In some examples, the first sheet 310, the first bipolar plate 315, the MEA 320, the second end plate 335, the second sheet 330 and/or the second bipolar plate 325 may be assembled (e.g., and/or coupled) using a plurality of bolts, a plurality of washers and/or a plurality of nuts.

Figure 4A:
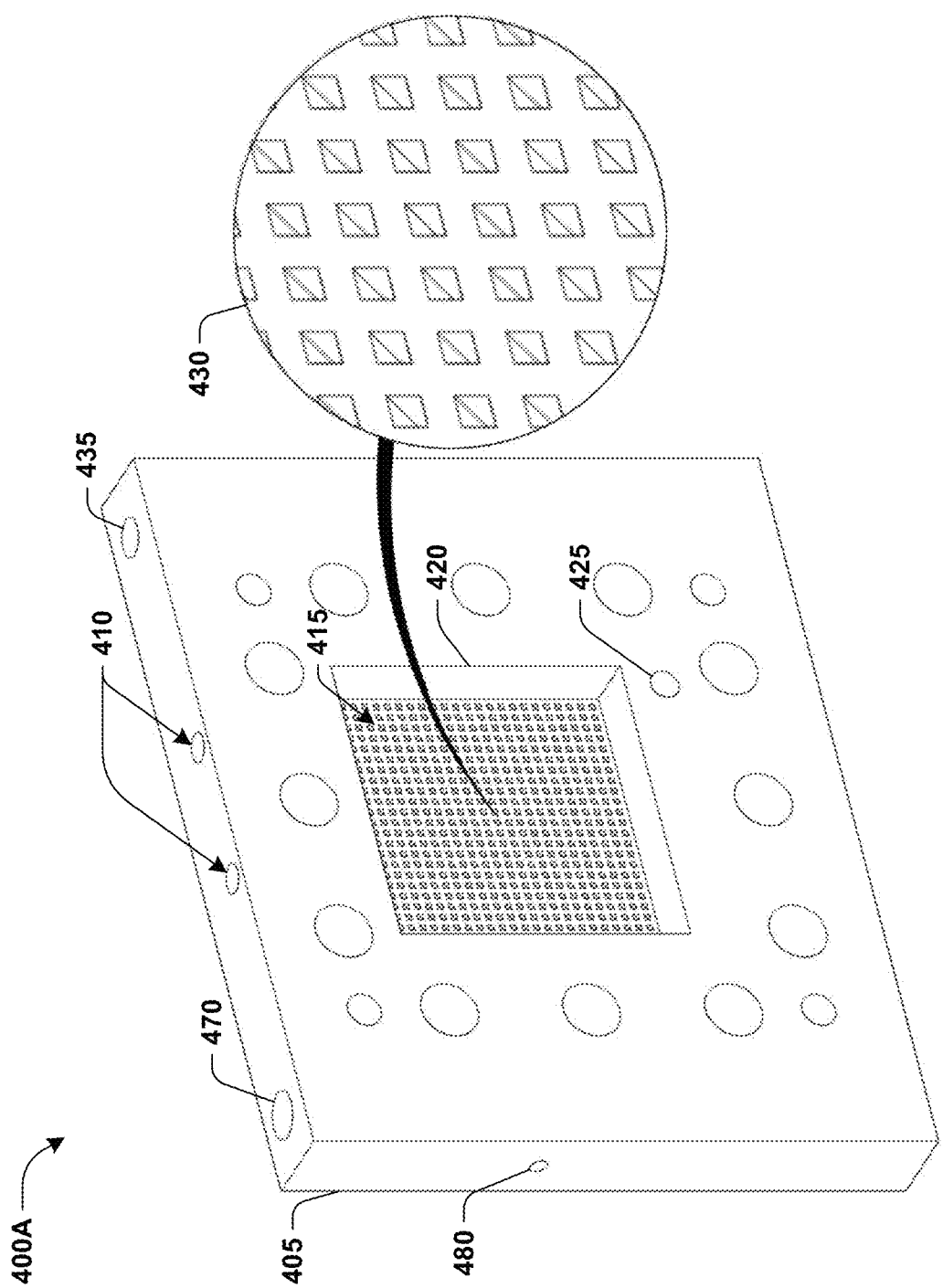
FIG. 4A is a 3-dimensional model illustrating a first side of a bipolar plate.
Figure 4B:
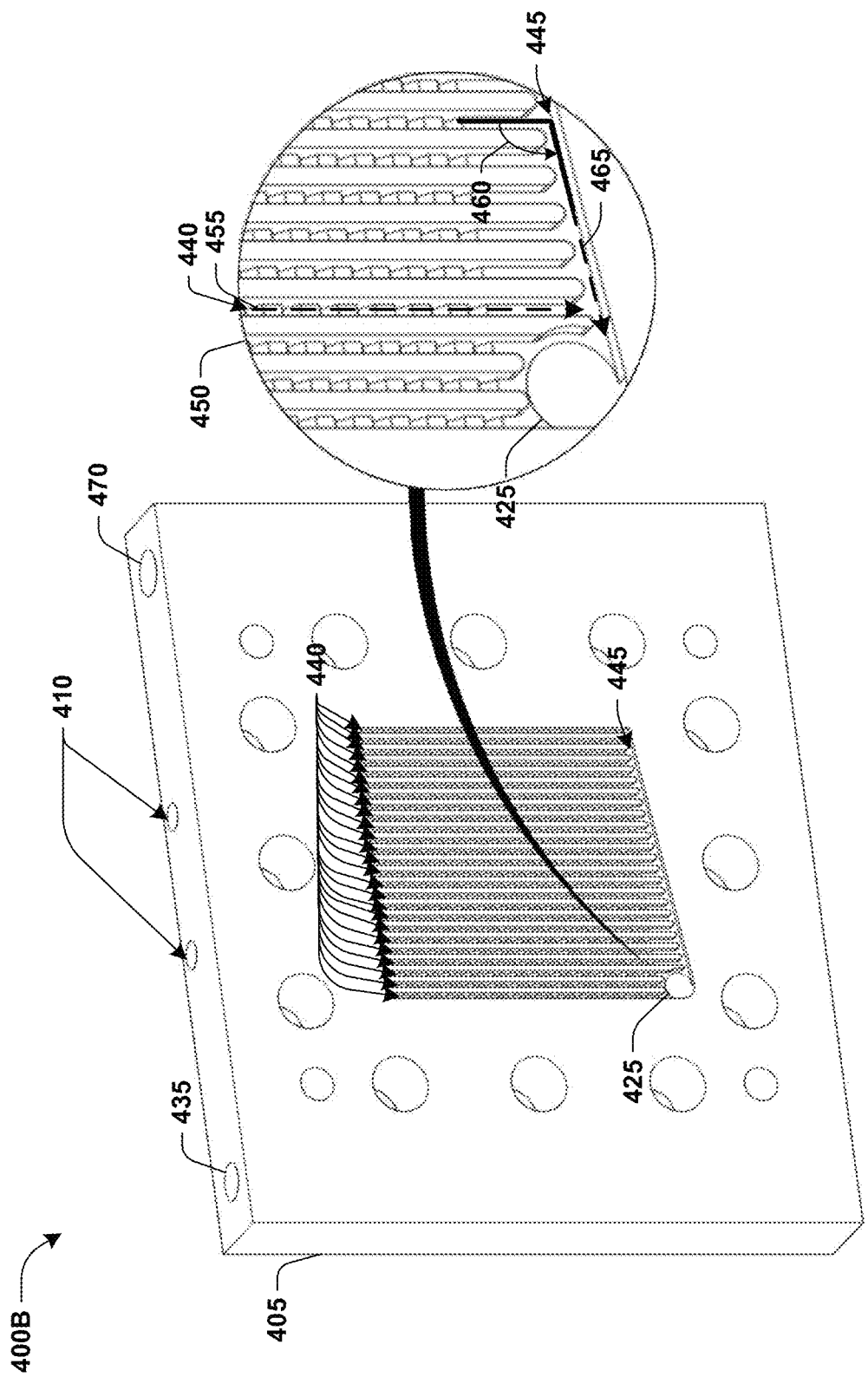
FIG. 4B is a 3-dimensional model illustrating a second side of a bipolar plate.
Figure 4C:
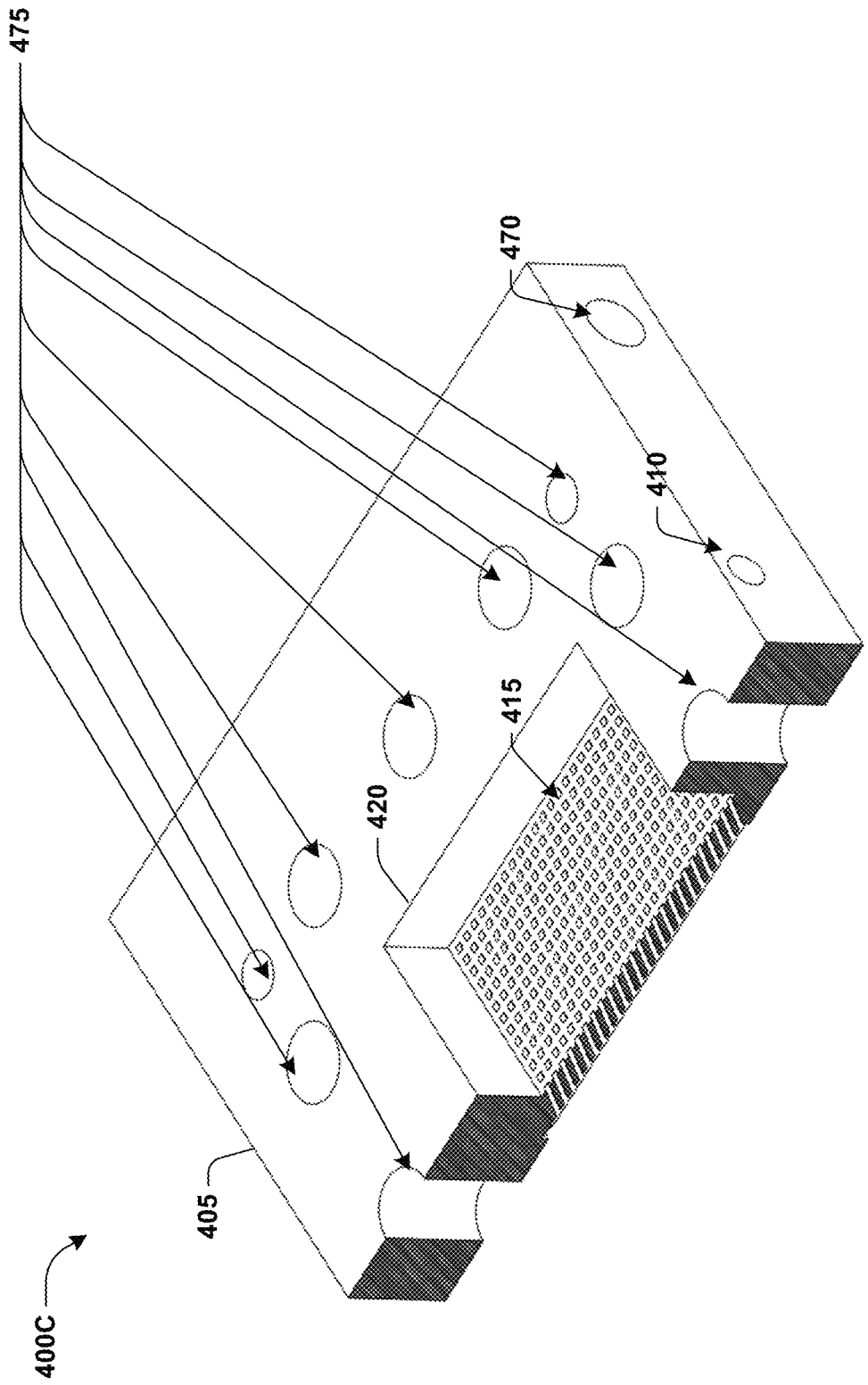
FIG. 4C is a 3-dimensional model illustrating a cross-section of a bipolar plate.

FIGS. 4A-4C present various perspectives of a bipolar plate 405 configured for use within a fuel cell. FIG. 4A presents a first perspective 400A of a first side of the bipolar plate 405. The bipolar plate 405 may comprise a material such as metal, coated metal, graphite, flexible graphite, carbon-carbon composites, carbon-polymer composites and/or a different material. The bipolar plate 405 may comprise a flow field comprising a chamber 420 on the first side of the bipolar plate 405. The flow field (e.g., of the bipolar plate 405) may (e.g., further) comprise a plurality of holes 415 at a first side of the chamber 420. The plurality of holes 415 may extend from the first side of the chamber 420 to a second side of the bipolar plate 405.

The bipolar plate 405 may (e.g., further) comprise a plurality of input holes 410 configured to conduct reactants flowing from a source to the chamber 420. The plurality of input holes 410 may extend from a third side of the bipolar plate 405 to a second side of the chamber 420. The plurality of input holes 410 may be connected to the source and the reactants may flow through the plurality of input holes 410 into the chamber 420. The reactants may accumulate inside the chamber 420. The plurality of holes 415 (e.g., of the flow field) may be configured to conduct the reactants flowing from the chamber 420 to the second side of the bipolar plate 405 and impinge on a catalyst layer (e.g., of an MEA) adjacent to (e.g., the second side of) the bipolar plate 405. The flow field (e.g., and/or the bipolar plate 405) may (e.g., further) comprise an output hole 425 at the second side of the bipolar plate 405. The output hole 425 may extend from the second side of the bipolar plate 405 to the first side of the bipolar plate 405. A portion of the plurality of holes 415 is presented in an enlarged view 430 of the plurality of holes 415.

In some examples, a tubular heating device (e.g., tubular heater) may be comprised within a first hole 435. The tubular heating device may be configured to heat the fuel cell and/or the bipolar plate 405. The tubular heating device may assist in turning on (e.g., and/or starting up) the fuel cell. In some examples, electric circuit terminals (e.g., of a conductor and/or a load) may be connected to the bipolar plate 405 via a second hole 470 (e.g., using one or more screws, bolts, etc.). In some examples, one or more temperature sensors may be comprised within a third hole 480. The one or more temperature sensors may measure and/or monitor an operating temperature of the fuel cell.

FIG. 4B presents a second perspective 400B of the second side of the bipolar plate 405. The flow field (e.g., of the bipolar plate 405) may comprise a plurality of channels 440 on the second side of the bipolar plate 405. In some examples, the plurality of channels 440 may be located across openings of the plurality of holes 415 (e.g., on the second side of the bipolar plate 405). The plurality of channels 440, a second channel 445 and the output hole 425 are (e.g., further) presented in an enlarged view 450. The plurality of channels 440 may be configured to conduct a portion of the reactants (e.g., excess reactants, unused reactants, etc.) and/or reaction products (e.g., water, steam, carbon-dioxide) (generated at the MEA and/or the bipolar plate 405 and/or between the MEA and the bipolar plate 405) in a first direction 455 to the second channel 445 and/or to the output hole 425. In some examples, the second channel 445 may be configured to conduct the portion of the reactants and/or the reaction products in a second direction 465 to the output hole 425. In some examples, an angle 460 between the first direction 455 and the second direction 465 may be greater than 90 degrees (e.g., in order to optimize the flow of the portion of the reactants and/or the reaction products to the output hole 425) and/or less than 90 degrees.

FIG. 4C presents a third perspective 400C of a cross-section of the bipolar plate 405 comprising the chamber 420, an input hole of the plurality of input holes 410 and a portion of the plurality of holes 415. In some examples, the bipolar plate 405 may (e.g., further) comprise an assortment of holes 475 for assembling the fuel cell and/or for coupling the bipolar plate 405 to a second bipolar plate, one or more end plates, one or more sheets and/or the MEA using a plurality of bolts, a plurality of washers and/or a plurality of nuts. In some examples, one or more holes of the assortment of holes 475 may comprise guide bars to facilitate the assembling of the fuel cell.

Figure 5:
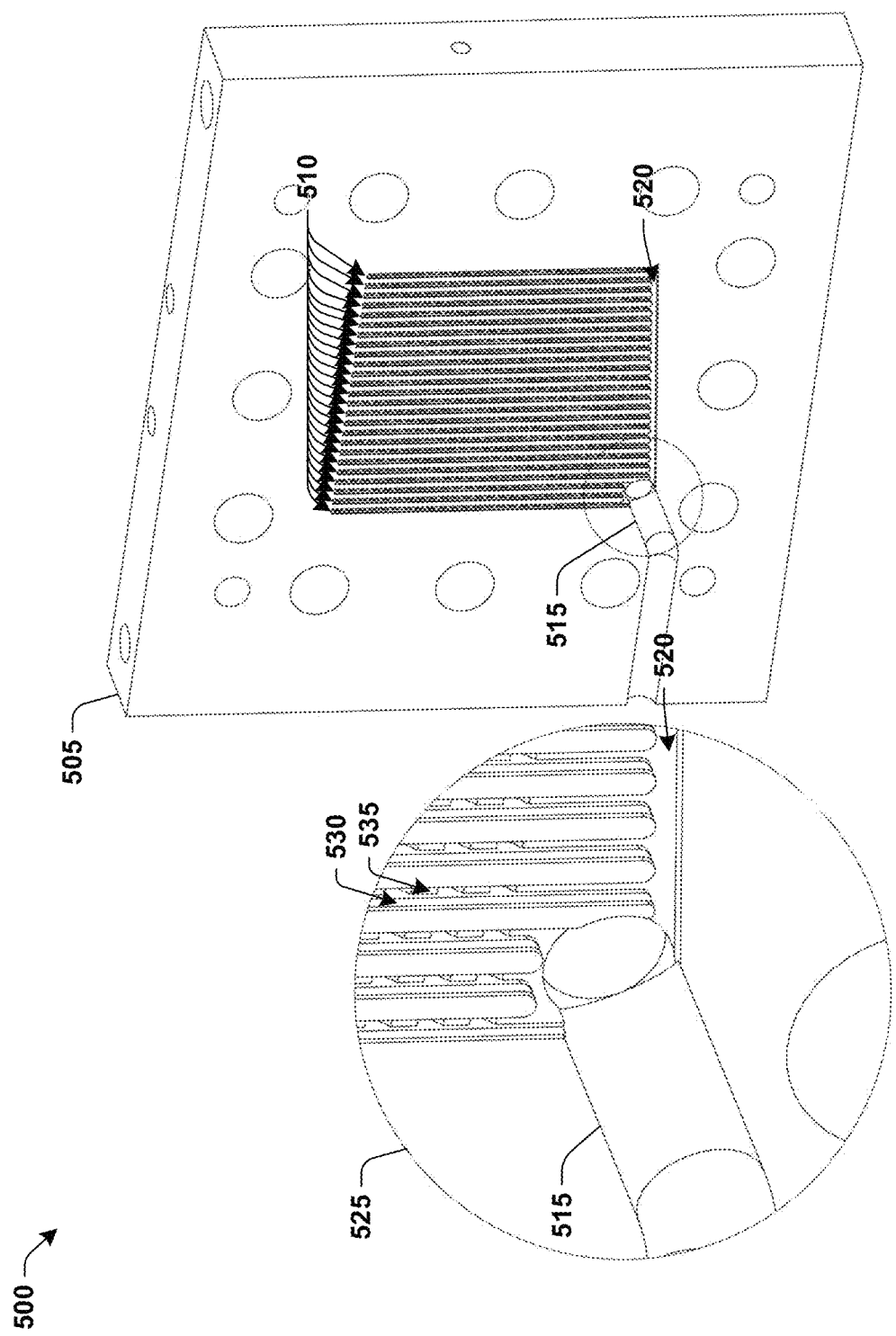
FIG. 5 is a 3-dimensional model illustrating a second side of a bipolar plate.

FIG. 5 presents a second side of a bipolar plate 505 configured for use within a fuel cell. The bipolar plate 505 may comprise a material such as metal, coated metal, graphite, flexible graphite, carbon-carbon composites, carbon-polymer composites and/or a different material. The bipolar plate 505 may comprise a flow field comprising a plurality of holes (e.g., a jet array of impingement jet passages). The plurality of holes (e.g., of the flow field) may be configured to conduct the reactants flowing from a first side of the bipolar plate 505 (e.g., and/or from a chamber of the bipolar plate 505) to the second side of the bipolar plate 505 and impinge on an MEA adjacent to (e.g., the second side of) the bipolar plate 505.

The flow field (e.g., of the bipolar plate 505) may comprise a plurality of channels 510 on the second side of the bipolar plate 505. In some examples, the plurality of channels 510 may be located across openings of the plurality of holes (e.g., on the second side of the bipolar plate 505). The flow field (e.g., of the bipolar plate 505) may comprise a channel 515 at the first side of the bipolar plate 505. The channel 515 may extend from a first part of the second side of the bipolar plate 505 to a third side of the bipolar plate 505. For example, the channel 515 may be adjacent to the plurality of channels 510. Alternatively and/or additionally, at least a portion of the channel 515 may be located below one or more first channels of the plurality of channels 510 and/or adjacent to (e.g., next to, to a side of) one or more second channels of the plurality of channels 510.

The plurality of channels 510, a second channel 520 and the channel 515 are (e.g., further) presented in an enlarged view 525. The plurality of channels 510 may be configured to conduct a portion of the reactants (e.g., excess reactants, unused reactants, etc.) and/or reaction products (e.g., water, steam, carbon-dioxide) (generated at the MEA and/or the bipolar plate 505 and/or between the MEA and the bipolar plate 505) in a first direction to the channel 515 and/or to the second channel 520. In some examples, the second channel 520 may be configured to conduct the portion of the reactants and/or the reaction products in a second direction to the channel 515. In some examples, an angle between the first direction and the second direction may be greater than 90 degrees (e.g., in order to optimize the flow of the portion of the reactants and/or the reaction products to the channel 515) and/or less than 90 degrees.

In some examples, the plurality of channels 510 may comprise a plurality of grooves. For example, each channel of the plurality of channels 510 may comprise a first groove on a first side of the channel (e.g., corresponding to a first wall of the channel) and a second groove on a second side of the channel (e.g., corresponding to a second wall of the channel). The first side of the channel may oppose (e.g., face, be opposite to, etc.) the second side of the channel. For example, a third channel 535 of the plurality of channels 510 may comprise a first groove 530 on a first side of the third channel 535 (e.g., a first wall of the third channel 535). The third channel 535 of the plurality of channels 510 may comprise a second groove on a second side of the third channel 535 (e.g., a second wall of the third channel 535), opposing the first side of the third channel 535. In low temperature fuel cells, such as PEM fuel cells, the plurality of grooves may assist in conducting the portion of the reactants (e.g., produced liquid water) in the first direction to the second channel 520 and/or to the channel 515. Accordingly, the channel 515 may prevent water flooding inside the fuel cell and may preserve performance of the fuel cell. In some examples, the channel 515 may be configured to conduct the portion of the reactants and/or the reaction products to outside of the fuel cell.

Figure 6:
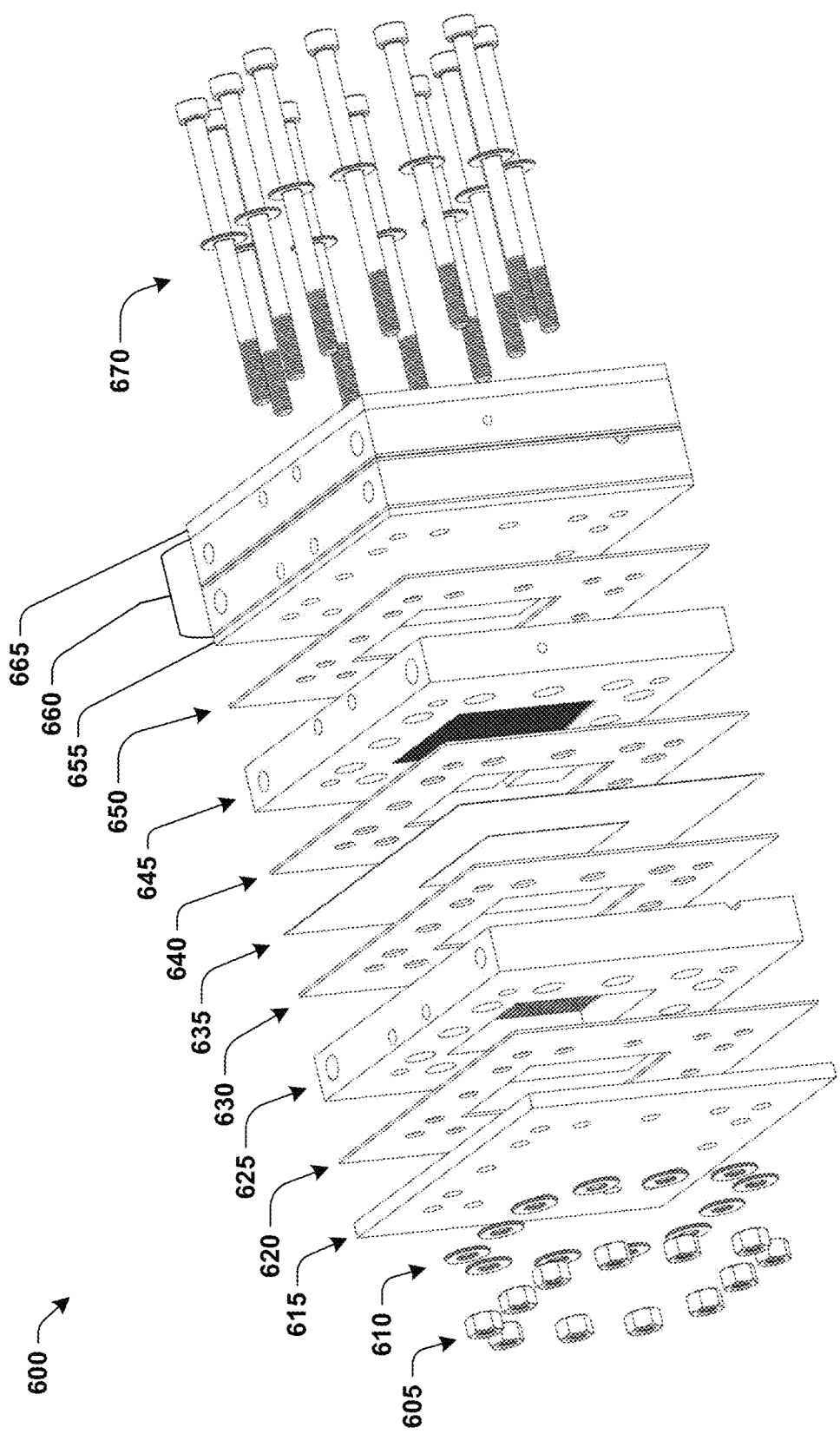
FIG. 6 is a 3-dimensional model illustrating how a fuel cell stack can be made using a bipolar plate comprising the present flow field.

FIG. 6 presents a fuel cell stack 600. The fuel cell stack 600 may comprise a plurality of nuts 605, a plurality of washers 610, a first end plate 615, a first sealing sheet 620, a first bipolar plate 625, a first MEA sheet 630, a first MEA 635, a second MEA sheet 640, a second bipolar plate 645, a second sealing sheet 650, a first separating sheet 655, a first fuel cell 660, a second end plate 665 and/or a plurality of bolts 670. In some examples, the first sealing sheet 620, the first bipolar plate 625, the first MEA sheet 630, the first MEA 635, the second MEA sheet 640, the second bipolar plate 645 and/or the second sealing sheet 650 may be part of a second fuel cell. In some examples, the first fuel cell 660 may comprise a third sealing sheet, a third bipolar plate, a third MEA sheet, a second MEA, a fourth MEA sheet, a fourth bipolar plate and/or a fourth sealing sheet. In some examples, the first end plate 615, the first sealing sheet 620, the first bipolar plate 625, the first MEA sheet 630, the first MEA 635, the second MEA sheet 640, the second bipolar plate 645, the second sealing sheet 650, the first separating sheet 655, the first fuel cell 660 and/or the second end plate 665 may be assembled (e.g., into the fuel cell stack 600) using the plurality of washers 610, the plurality of nuts 605 and/or the plurality of bolts 670 (e.g., and/or using other hardware). In some examples, the fuel cell stack 600 may comprise more than two fuel cell units.

It may be appreciated that at least some of the disclosed subject matter may improve existing techniques including but not limited to parallel flow fields, serpentine flow fields, interdigitated flow fields and/or pin-type flow fields. At least some of the disclosed subject matter may be implemented in the context of an impingement jet cooling system, as described in H. H. Cho, K. M. Kim, J. Song, Applications of Impingement Jet Cooling Systems, in: Cooling Systems: Energy, Engineering and Applications, NOVA, 2011, which is incorporated herein by reference.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A fuel cell, comprising:
   a bipolar plate comprising a chamber on a first side of the bipolar plate;
   a plurality of holes at a first side of the chamber, wherein each hole of the plurality of holes extends from the first side of the chamber to a second side of the bipolar plate, the second side of the bipolar plate different than the first side of the bipolar plate; and
   a membrane electrode assembly adjacent to the second side of the bipolar plate, the membrane electrode assembly comprising an electrolyte between a first catalyst and a second catalyst, wherein the plurality of holes are configured to conduct reactants flowing from the chamber to the second side of the bipolar plate and impinge on the membrane electrode assembly.

2. The fuel cell of claim 1, comprising:
   one or more input holes configured to conduct the reactants to flow from a source to the chamber.

3. The fuel cell of claim 1, comprising:
   an output hole at the second side of the bipolar plate, extending from the second side of the bipolar plate to at least one of the first side of the bipolar plate, the second side of the bipolar plate or a different side of the bipolar plate and the output hole is configured to conduct at least one of a portion of the reactants or reaction products flowing from the second side of the bipolar plate to outside of the fuel cell.

4. The fuel cell of claim 1, comprising:
a channel at the second side of the bipolar plate, extending from a first part of the second side of the bipolar plate to a third side of the bipolar plate, the third side of the bipolar plate different from the first side of the bipolar plate and the second side of the bipolar plate, and the channel configured to conduct at least one of a portion of the reactants or reaction products flowing from the second side of the bipolar plate to outside of the fuel cell.

5. The fuel cell of claim 3, comprising:
a plurality of channels on the second side of the bipolar plate configured to conduct at least one of the portion of the reactants or the reaction products to the output hole.

6. The fuel cell of claim 5, wherein channels of the plurality of channels are parallel to each other and are parallel to at least one of the second side of the bipolar plate or the membrane electrode assembly.

7. The fuel cell of claim 6, wherein at least a portion of the plurality of channels are configured to conduct at least one of the portion of the reactants or the reaction products to a second channel, the second channel configured to conduct at least one of the portion of the reactants or the reaction products to the output hole.

8. The fuel cell of claim 7, wherein each channel of the plurality of channels comprises a first groove on a first side of the channel and a second groove on a second side of the channel, the first side of the channel opposing the second side of the channel.

9. The fuel cell of claim 1, wherein the plurality of holes is at an angle relative to the membrane electrode assembly, the angle between 0 degrees and 180 degrees.

10. The fuel cell of claim 1, wherein a first opening of each hole of the plurality of holes has a first dimension and a second opening of each hole of the plurality of holes has a second dimension.

11. The fuel cell of claim 1, wherein an opening of each hole of the plurality of holes comprises one of a triangle, a quadrangle, a hexagon, an octagon, a circle or an ellipse.

12. The fuel cell of claim 1, wherein the first side of the chamber has a first dimension and a second side of the chamber has a second dimension.

13. The fuel cell of claim 1, wherein the membrane electrode assembly comprises a first gas diffusion layer and a second gas diffusion layer, wherein the first catalyst, the second catalyst and the electrolyte are between the first gas diffusion layer and the second gas diffusion layer.

14. The fuel cell of claim 1, wherein the fuel cell is comprised in a plurality of fuel cells combined in at least one of series or parallel.

15. The fuel cell of claim 1, comprising a polymer electrolyte membrane fuel cell, an alkaline fuel cell, a solid oxide fuel cell, a phosphoric acid fuel cell, a direct methanol fuel cell or a molten carbonate fuel cell.

16. The fuel cell of claim 1, wherein the bipolar plate comprises a material, the material comprising at least one of metal, coated metal, graphite, flexible graphite, carbon-carbon composites, carbon-polymer composites or a different material.

17. A bipolar plate, comprising:
a plurality of holes at a first side of the bipolar plate, wherein each hole of the plurality of holes extends from the first side of the bipolar plate to a second side of the bipolar plate, the second side of the bipolar plate different than the first side of the bipolar plate, wherein the plurality of holes are configured to conduct reactants flowing from the first side of the polar plate to the second side of the bipolar plate.

18. A fuel cell, comprising:
a first bipolar plate and a second bipolar plate;
a membrane electrode assembly between the first bipolar plate and the second bipolar plate, the membrane electrode assembly comprising an electrolyte between a first catalyst and a second catalyst;
a first chamber on a first side of the first bipolar plate;
a first plurality of holes at a first side of the first chamber, wherein each hole of the first plurality of holes extends from the first side of the first chamber to a second side of the first bipolar plate, the second side of the first bipolar plate different than the first side of the first bipolar plate and adjacent to the membrane electrode assembly, wherein the first plurality of holes are configured to conduct first reactants flowing from the bottom of the first chamber to the second side of the first bipolar plate and impinge on at least one of the first catalyst or a first gas diffusion layer between the first bipolar plate and the first catalyst;
a second chamber on a first side of the second bipolar plate; and
a second plurality of holes at a first side of the second chamber, wherein each hole of the second plurality of holes extends from the first side of the second chamber to a second side of the second bipolar plate, the second side of the second bipolar plate different than the first side of the second bipolar plate and adjacent to the membrane electrode assembly, wherein the second plurality of holes is configured to conduct second reactants flowing from the second chamber to the second side of the second bipolar plate and impinge on at least one of the second catalyst or a second gas diffusion layer between the second bipolar plate and the second catalyst.

19. The fuel cell of claim 18, comprising:
a first output hole at the second side of the first bipolar plate extending from the second side of the first bipolar plate to at least one of the first side of the first bipolar plate, the second side of the first bipolar plate or a different side of the first bipolar plate, wherein the first output hole is configured to conduct a portion of the first reactants to flow from the second side of the first bipolar plate to outside of the fuel cell; and
a second output hole at the second side of the second bipolar plate extending from the second side of the second bipolar plate to at least one of the first side of the second bipolar plate, the second side of the second bipolar plate or a different side of the second bipolar plate, wherein the second output hole is configured to conduct a portion of the second reactants and reaction products flowing from the second side of the second bipolar plate to outside of the fuel cell.

20. The fuel cell of claim 19, comprising:
a first plurality of channels on the second side of the first bipolar plate configured to conduct the portion of the first reactants to the first output hole; and
a second plurality of channels on the second side of the second bipolar plate configured to conduct of the portion of the second reactants and the reaction products to the second output hole.

* * * * *